United States Patent [19]
Ohtake et al.

[11] Patent Number: 6,111,591
[45] Date of Patent: Aug. 29, 2000

[54] IMAGE PROCESSING SYSTEM AND INFORMATION PROCESSING SYSTEM

[75] Inventors: Shin Ohtake; Naoyuki Enomoto; Masanori Satake; Masami Kurata, all of Ebina, Japan

[73] Assignee: Fuji Xerox Co., Ltd., Tokyo, Japan

[21] Appl. No.: 08/797,977

[22] Filed: Feb. 12, 1997

[30] Foreign Application Priority Data

Feb. 16, 1996 [JP] Japan .................................. 8-029701

[51] Int. Cl.[7] .............................. G06F 15/00; G06T 1/00
[52] U.S. Cl. ...................... 345/501; 345/521; 345/509; 711/154; 711/158
[58] Field of Search ..................... 345/501, 502, 345/509, 520, 521; 711/151, 154, 158; 395/115, 116; 358/1.16, 1.17

[56] References Cited

U.S. PATENT DOCUMENTS

| | | | |
|---|---|---|---|
| 4,974,175 | 11/1990 | Suzuki et al. | 345/433 |
| 5,253,351 | 10/1993 | Yamamoto et al. | 711/118 |
| 5,448,655 | 9/1995 | Yamaguchi | 382/304 |
| 5,717,440 | 2/1998 | Katsura et al. | 345/513 |

FOREIGN PATENT DOCUMENTS

| | | |
|---|---|---|
| 621538 | 4/1994 | European Pat. Off. ........ G06F 13/38 |
| 58-29043 | 2/1983 | Japan . |
| 5-100803 | 4/1993 | Japan . |
| 5-122474 | 5/1993 | Japan . |
| 6-44014 | 2/1994 | Japan . |
| 6-305204 | 11/1994 | Japan . |
| 7-144442 | 6/1995 | Japan . |
| 7-210365 | 8/1995 | Japan . |

Primary Examiner—Matthew M. Kim
Assistant Examiner—Sy D. Luu
Attorney, Agent, or Firm—Oliff & Berridge, PLC

[57] ABSTRACT

An image processing system 1 (information processing system) includes a plurality of input interfaces 11, 12, and 13 for inputting image data output from a plurality of host systems C, PC1, and PC2, an input buffer 41 for storing the image data input through the input interfaces, determination mechanism for determining the upper limit value of the storage amount of the image data stored in the input buffer 41 for at least one of the input interfaces 11–13, and mechanism for storing image data in the input buffer in a scattering manner so as not to exceed the upper limit value determined by the determination mechanism.

19 Claims, 15 Drawing Sheets

(OPERATION OF DECOMPOSER TASK)

FIG. 9A

| I/F TRANSFER CAPABILITY \ PRINTER CAPABILITY | A | B | C | D |
|---|---|---|---|---|
| a | 4 | 3 | 3 | 2 |
| b | 3 | 3 | 2 | 2 |
| c | 3 | 2 | 2 | 1 |
| d | 2 | 2 | 1 | 1 |

FIG. 9B

| I/F TRANSFER CAPABILITY \ PRINTER CAPABILITY | A | B | C | D |
|---|---|---|---|---|
| a | 4 | 3 | 3 | 2 |
| b | 3 | 3 | 2 | 2 |
| c | 3 | 2 | 2 | 1 |
| d | 2 | 2 | 1 | 1 |

FIG. 10

| NUMBER OF INPUT DATA PIECES \ DATA ORDER | 1 | 2 | 3 | 4 | 5 | 6 | 7 | 8 |
|---|---|---|---|---|---|---|---|---|
| 1 | 4 |   |   |   |   |   |   |   |
| 2 | 4 | 2 |   |   |   |   |   |   |
| 3 | 4 | 2 | 2 |   |   |   |   |   |
| 4 | 3 | 2 | 2 | 1 |   |   |   |   |
| 5 | 3 | 2 | 1 | 1 | 1 |   |   |   |
| 6 | 2 | 2 | 1 | 1 | 1 | 1 |   |   |
| 7 | 2 | 1 | 1 | 1 | 1 | 1 | 1 |   |
| 8 | 1 | 1 | 1 | 1 | 1 | 1 | 1 | 1 |

IMAGE PROCESSING SYSTEM AND INFORMATION PROCESSING SYSTEM

BACKGROUND OF THE INVENTION

1. Field of the Invention

This invention relates to an image processing system and an information processing system for receiving data from a number of host systems via a number of input interfaces and processing the received data.

2. Description of the Related Art

Hitherto, several arts of sharing an input buffer to handle data input through a number of input interfaces have been disclosed. For example, an art of dividing a large memory area into small blocks for management, thereby changing the input buffer capacity of a printer without again turning on power is disclosed in Japanese Patent Unexamined Publication No. Hei 7-144442.

Further, an input method of data through a number of interfaces is described. In this method, however, if data input through one interface occupies all the input buffer, data cannot be input through any other interface, causing an increase in the load of a host system and a busy state leading to an inoperative state.

Generally, the input buffer capacity is increased as means for shortening the duration of a problem such as the inoperative state caused by the busy state. For example, an art of changing the input buffer capacity in response to the input interface selection condition for improving the use efficiency is disclosed in Japanese Patent Unexamined Publication No. Hei 6-305204 and a method of analyzing the contents of input data and changing the input buffer capacity depending on whether the data is code or bit map data is disclosed in Japanese Patent Unexamined Publication No. Hei 6-44014.

However, if a time slice function of a multitask operating system is used to execute simultaneous input of data into an input buffer shared among input interfaces, the input buffer size needs to be changed during the data input. The "simultaneous input" mentioned here is defined as data input through more than one interface within a minute time interval like 0.1 seconds.

To share an input buffer at the simultaneous input time, an art of enabling host systems to specify how an input buffer of a printer having a number of input interfaces is shared is available as disclosed in Japanese Patent Unexamined Publication No. Hei 5-100803. In this art, while one of the host systems connected to the printer is outputting data, if another host system starts outputting data, it becomes necessary for the host systems to conduct input buffer capacity negotiations with each other. This causes the printer function to depend on the host systems, impairing the general versatility of the printer itself.

Also, an art of enlarging the buffer size when that an input buffer is full is sensed is disclosed in Japanese Patent Unexamined Publication No. Hei 7-210365. However, when simultaneous input into the input buffer is executed through input interfaces, if the input buffer size is enlarged for each input interface, the buffer size required for another process is limited, thus causing a problem of lowering the performance.

Further, an art of changing the allocation amount of a reception buffer having a fixed capacity to each of input interfaces is disclosed in Japanese Patent Unexamined Publication No. Hei 6-305204. However, in such an art, if the allocation amount is changed freely, a specific input interface monopolizes the reception buffer, making it impossible to input data from any other input interface.

SUMMARY OF THE INVENTION

It is therefore an object of the invention to provide an image processing system and an information processing system for decreasing the loads of host systems by sharing an input buffer among input interfaces efficiently.

According to the invention, there is provided an image processing system comprising a plurality of input interfaces for inputting image data output from a plurality of host systems, an input buffer being divided into a plurality of blocks for storing the image data input through the input interfaces, means for determining the upper limit value of the storage amount of the image data stored in the input buffer for at least one of the input interfaces, and means for storing image data of one job in blocks of the input buffer in a scattering manner so as not to exceed the upper limit value determined by the determination means.

According to the invention, there is provided an image processing system comprising a plurality of input interfaces for inputting image data output from a plurality of host systems, an input buffer for storing the image data input through the input interfaces, means for recognizing a capacity of an area of the input buffer not allocated to the input interfaces, means for allocating an input buffer area to the input interface to which image data is input based on the capacity recognized by the recognition means, and means for storing the image data in the area allocated by the allocation means.

According to the invention, there is provided an image processing system comprising a plurality of input interfaces for inputting image data output from a plurality of host systems, an input buffer for storing the image data input through the input interfaces, means for measuring an image data processing capability of the image processing system or each of the host systems for each input interface, means for allocating an area of the input buffer for storing image data to each input interface based on the image data processing capability measured by the measurement means, and means for storing the image data in the area allocated by the allocation means.

According to the invention, there is provided an information processing system comprising a plurality of input interfaces for inputting data output from a plurality of host systems, an input buffer being divided into a plurality of blocks for storing the data input through the input interfaces, means for determining the upper limit value of the storage amount of the data stored in the input buffer for at least one of the input interfaces, and means for storing data of one job in blocks of the input buffer in a scattering manner so as not to exceed the upper limit value determined by the determination means.

In the invention, data input through a number of input interfaces is stored in blocks of the input buffer in a scattering manner so that the upper limit value determined by the determination means is not exceeded, thus the input buffer can be shared among the input interfaces without being monopolized by any one of the input interfaces.

The capacity of an area of the input buffer not allocated to the input interfaces is recognized by the recognition means and an input buffer area is allocated to the input interface by the allocation means based on the recognized capacity, whereby an unused area of the input buffer can be allocated to the input interface effectively.

The measurement means measures the image data processing capability for each input interface, whereby the allocation means can allocate an input buffer area to each input interface based on the image data processing capability.

BRIEF DESCRIPTION OF THE DRAWINGS

The above and other objects and features of the present invention will be more apparent from the following description taken in conjunction with the accompanying drawings.

FIGS. 9A and 9B are illustrations to explain throughput inspection tables, respectively;

FIG. 10 is an illustration to explain an upper limit value setting table;

DETAILED DESCRIPTION OF THE PREFERRED EMBODIMENTS

Figure 1:
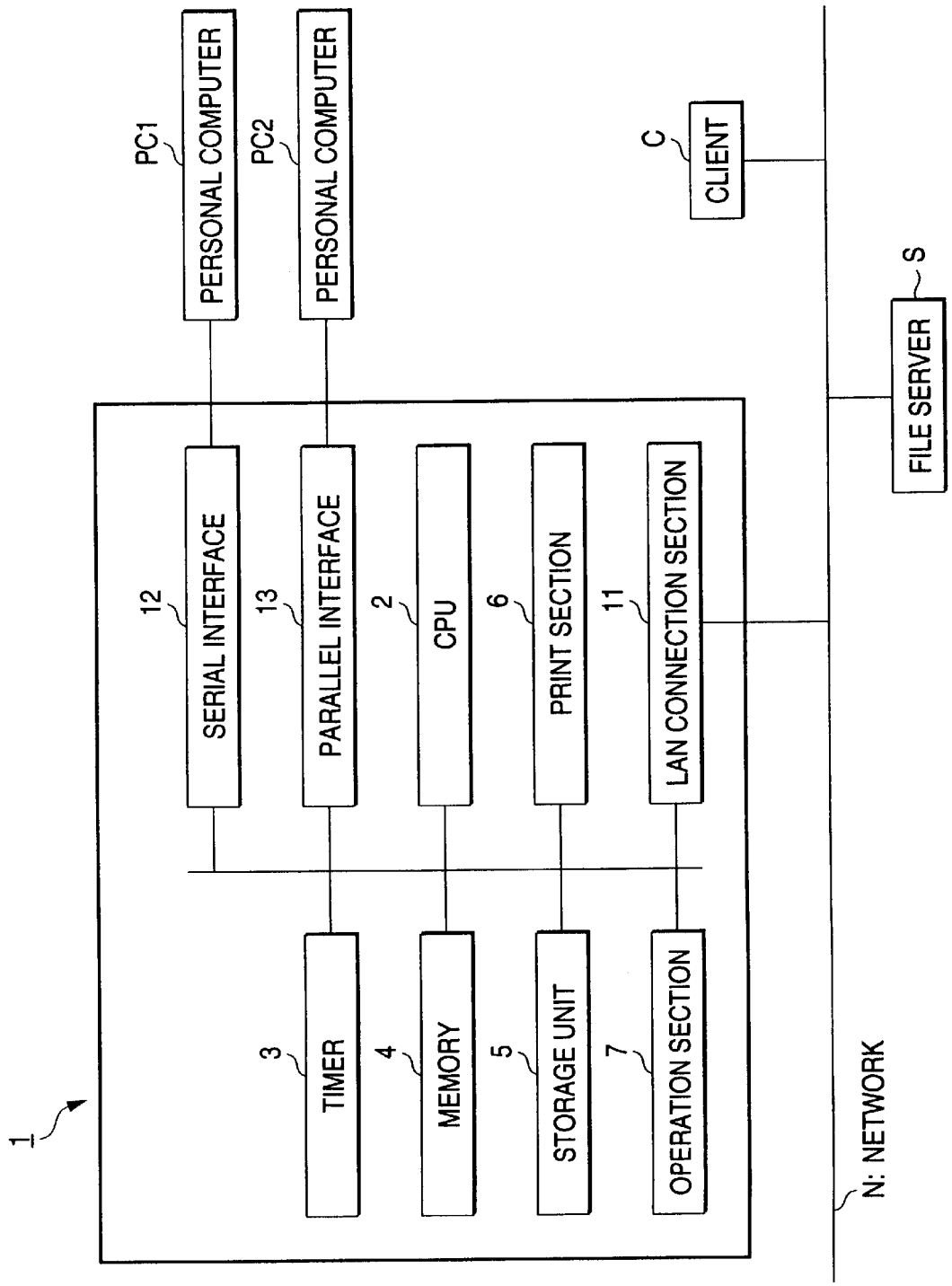
FIG. 1 is a block diagram to explain the hardware configuration in an embodiment of the invention.

Referring now to the accompanying drawings, there are shown preferred embodiments of the invention. FIG. 1 is a block diagram to explain the hardware configuration of an image processing system in an embodiment of the invention. An image processing system 1 in the embodiment comprises a CPU 2 for controlling the sections of the image processing system 1, a timer 3, a memory 4 used as an image data buffer, a storage unit 5, a print section 6 for outputting image data, an operation section 7, and a number of interfaces including a LAN connection section 11, which is an interface for receiving image data from a file server S and a client C via a network N, a serial interface 12 for receiving image data from a personal computer PC1, and a parallel interface 13 for receiving image data from a personal-computer PC2.

Figure 2:
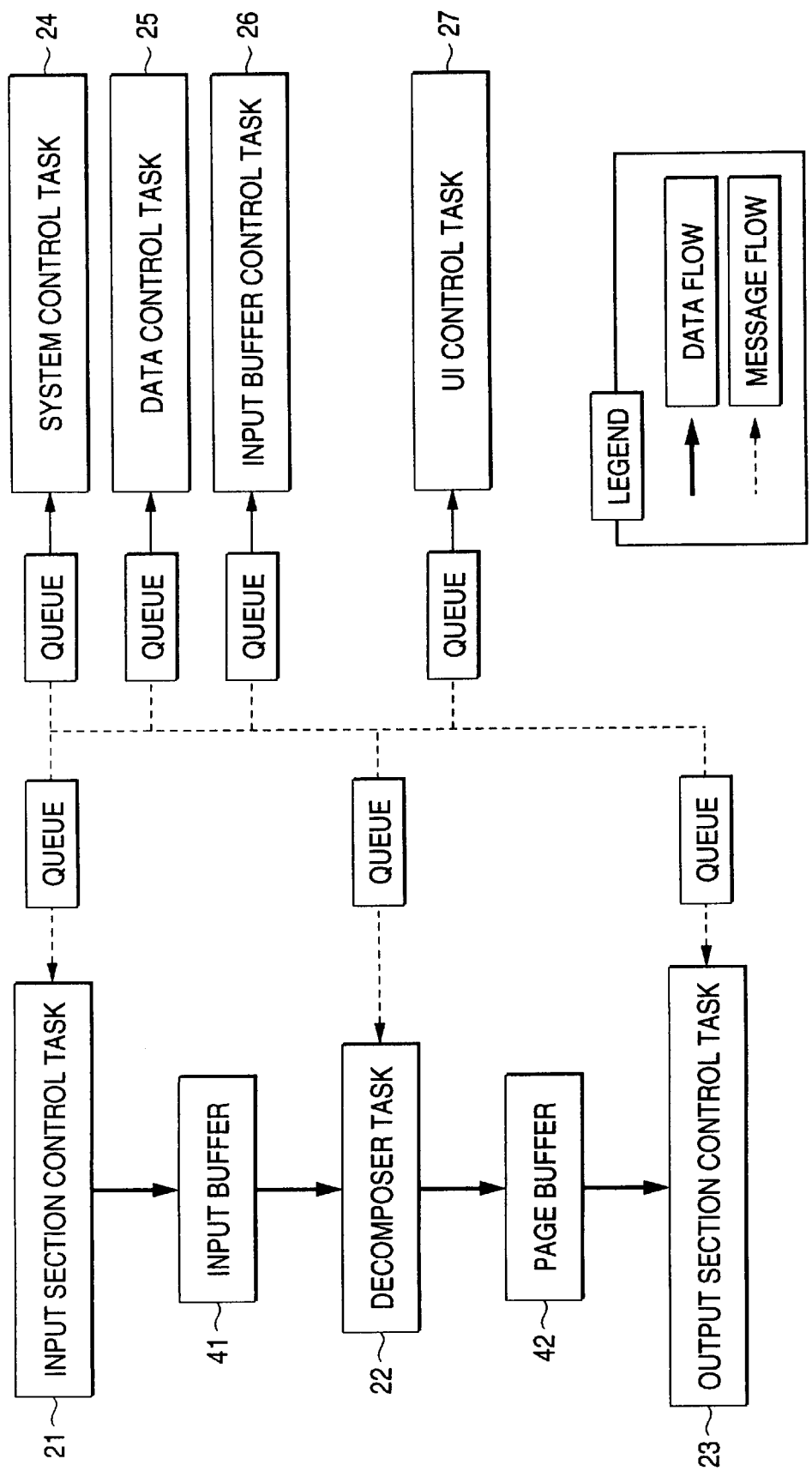
FIG. 2 is a block diagram to explain the software configuration in the embodiment of the invention.

FIG. 2 is a block diagram to explain the software configuration in the embodiment of the invention. The image processing system in the embodiment adopts a multitask configuration in which a number of tasks operate in a coordinated fashion. In FIG. 2, the arrow indicated by a solid line denotes a data flow and the arrow indicated by a broken line denotes a message flow. Message queues are used to exchange messages between tasks. As is well known in the processing art, the term task used herein denotes a section, circuit, component or the like of a processing system.

When an input section control task 21 senses reception of data, it notifies a data control task 25 of the data reception and stores the input data in an input buffer 41. At this time, the input buffer 41 is managed by an input buffer control task 26. Upon reception of the notification, the data control task 25 assigns an identifier to the data and sends a notification to a decomposer task 22.

The decomposer task 22 reads the data (print language) from the input buffer 41, converts the data into a printable image, and records the image in a page buffer 42. Upon completion of preparation of a 1-page image, the decomposer task 22 notifies an output section control task 23 of the event. The output section control task 23 transfers the image recorded in the page buffer 42 to the print section 6 (see FIG. 1) for outputting the image data to predetermined paper.

A system control task 24 controls initiating each task, etc. A UI control task 27 handles commands entered through an operation panel attached to the print section 6 (see FIG. 1) and produces display on a liquid crystal panel.

Figure 3:
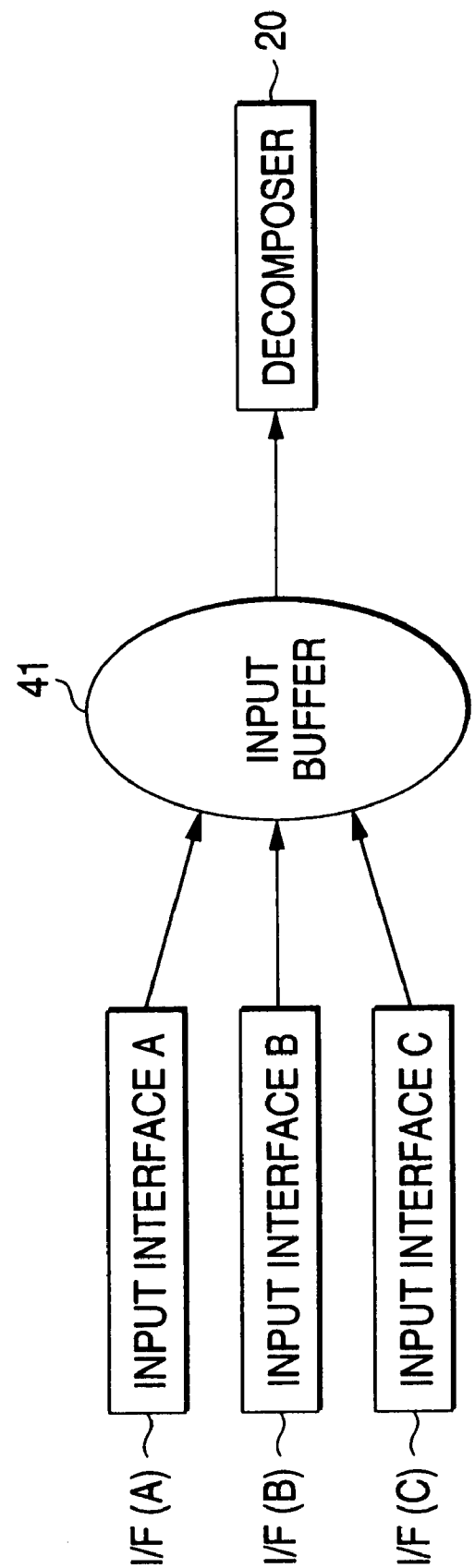
FIG. 3 is a schematic diagram to explain sharing an input buffer.

FIG. 3 is an illustration to show how the input buffer is shared among the input interfaces. For example, the input buffer 41 temporarily stores image data input through three input interfaces I/F (A) to I/F (C), and outputs the image data to a decomposer 20.

Figure 4:
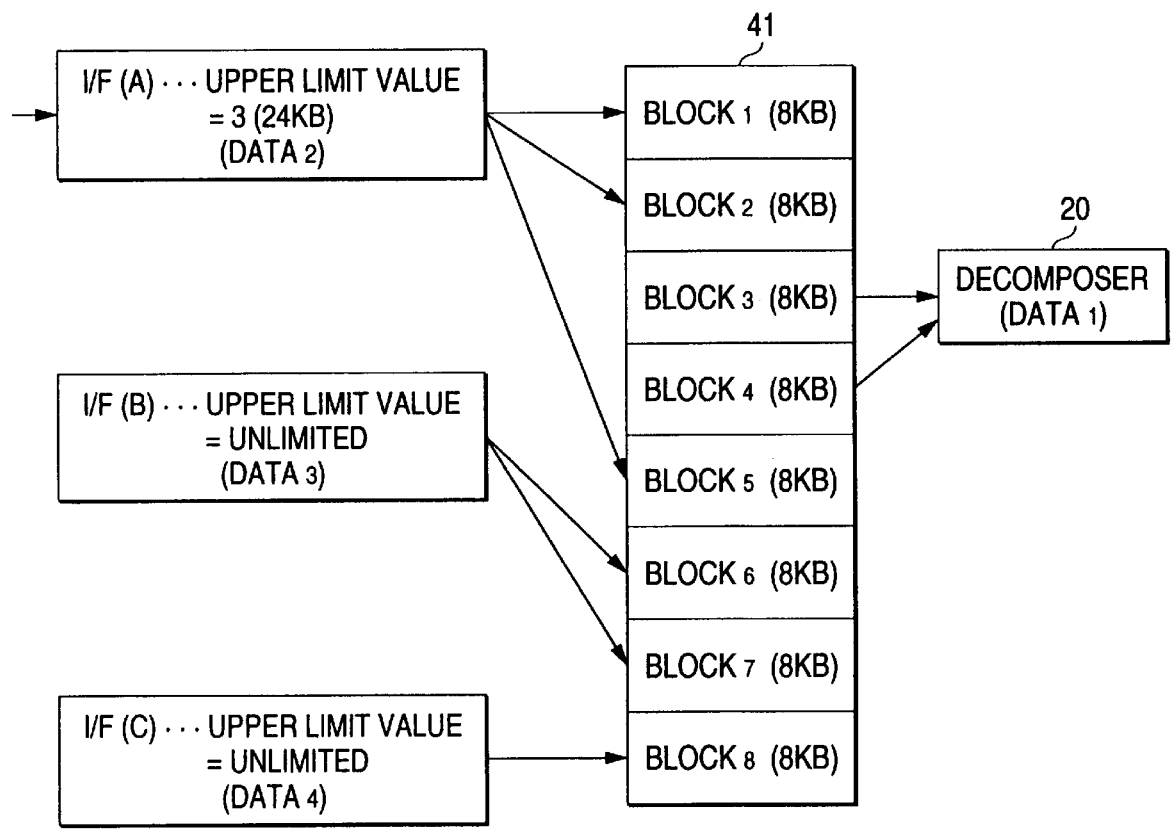
FIG. 4 is a schematic diagram to explain sharing the input buffer in block units.

FIG. 4 is a schematic diagram to explain sharing the input buffer in block units. That is, the input buffer 41 is divided, for example, into eight blocks of block 1 to block 8 each consisting of 8 KB, and image data sent from the input interfaces I/F (A)-I/F (C) is assigned to the blocks appropriately for storage.

The embodiment is characterized by the fact that the allocation amounts of the input buffer 41 to the input interfaces I/F (A)-I/F (C) are determined in various manners. In the example shown in FIG. 4, the allocation amount to the input interface I/F (A) is set to the upper limit value of three blocks (24 KB) and that to each of the input interfaces I/F (B) and I/F (C) is set to an unlimited value.

Figure 5:
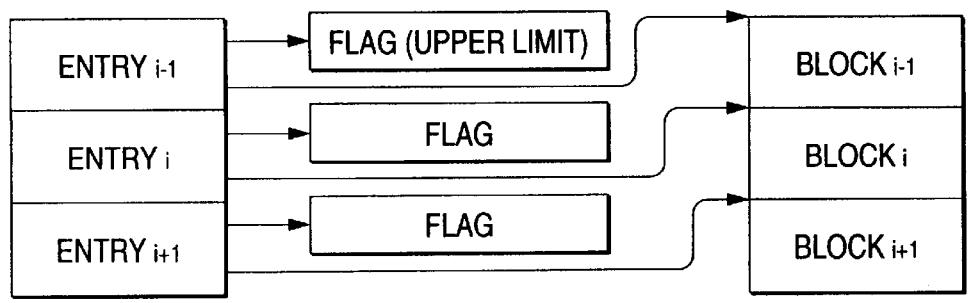
FIG. 5 is a schematic diagram to explain block management.

FIG. 5 is a schematic diagram to explain block management of the input buffer. In the figure, entry i corresponds to block i and holds a flag and a block pointer. The flag is used to judge whether or not the entry i is used. The block pointer is an identifier indicating the block area in which data is stored. If there is a block already reserved and not yet read, reserved block is linked following unread block and the data reception order is stored.

Figure 6:
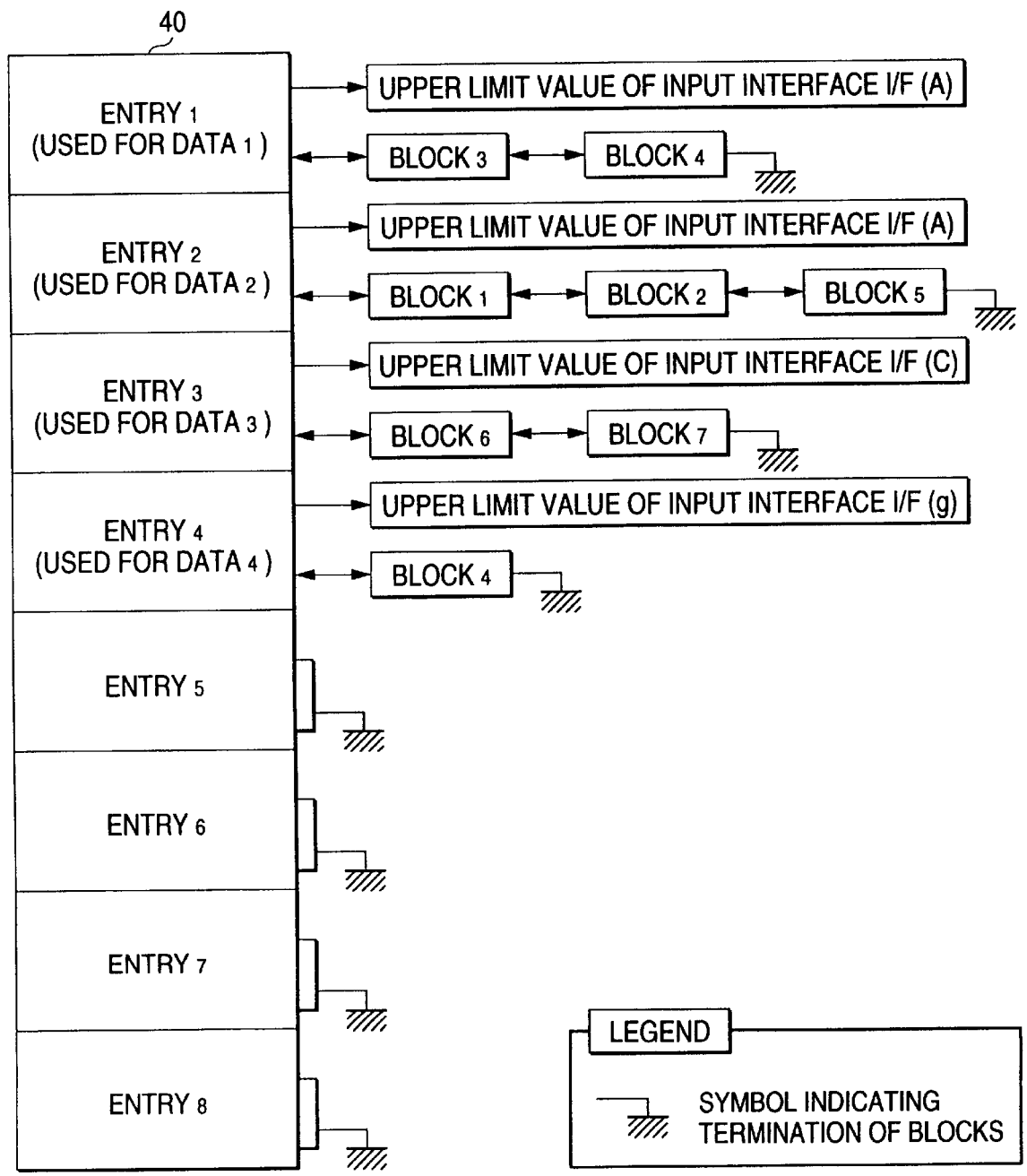
FIG. 6 is a schematic diagram to show how the blocks are linked in the state shown in FIG. 4.

FIG. 6 is a schematic diagram to show how the blocks are linked in the state shown in FIG. 4. For example, entry 1 holds the upper limit value of the input interface I/F (A) and a pointer to the block in which data 1 is stored. In the example shown in FIG. 6, entries 1–4 are used and entries 5–8 are unused. The block read order is stored as a list structure.

Figure 7:
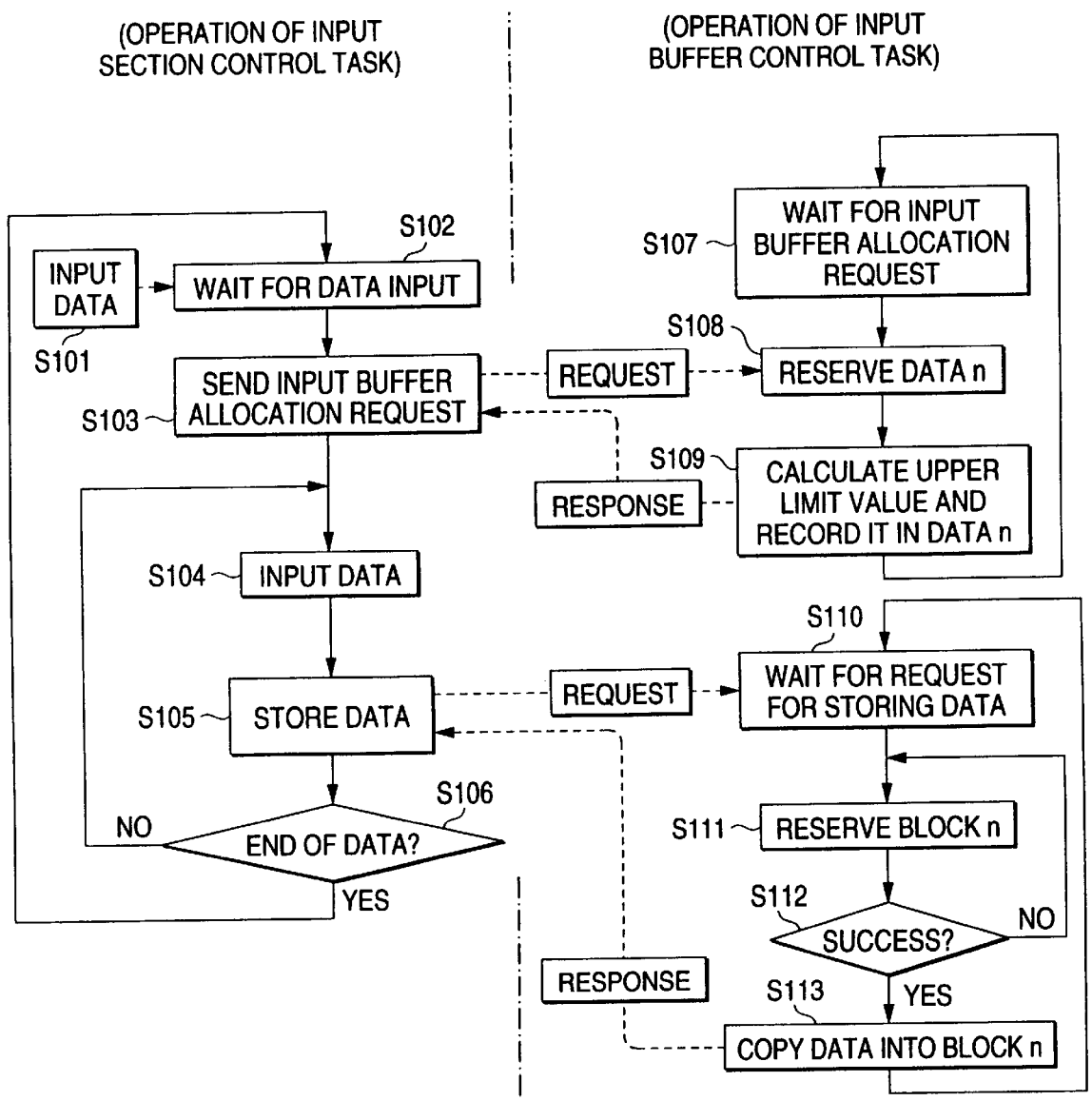
FIG. 7 is a flowchart to explain the operation (No.1)
Figure 8:
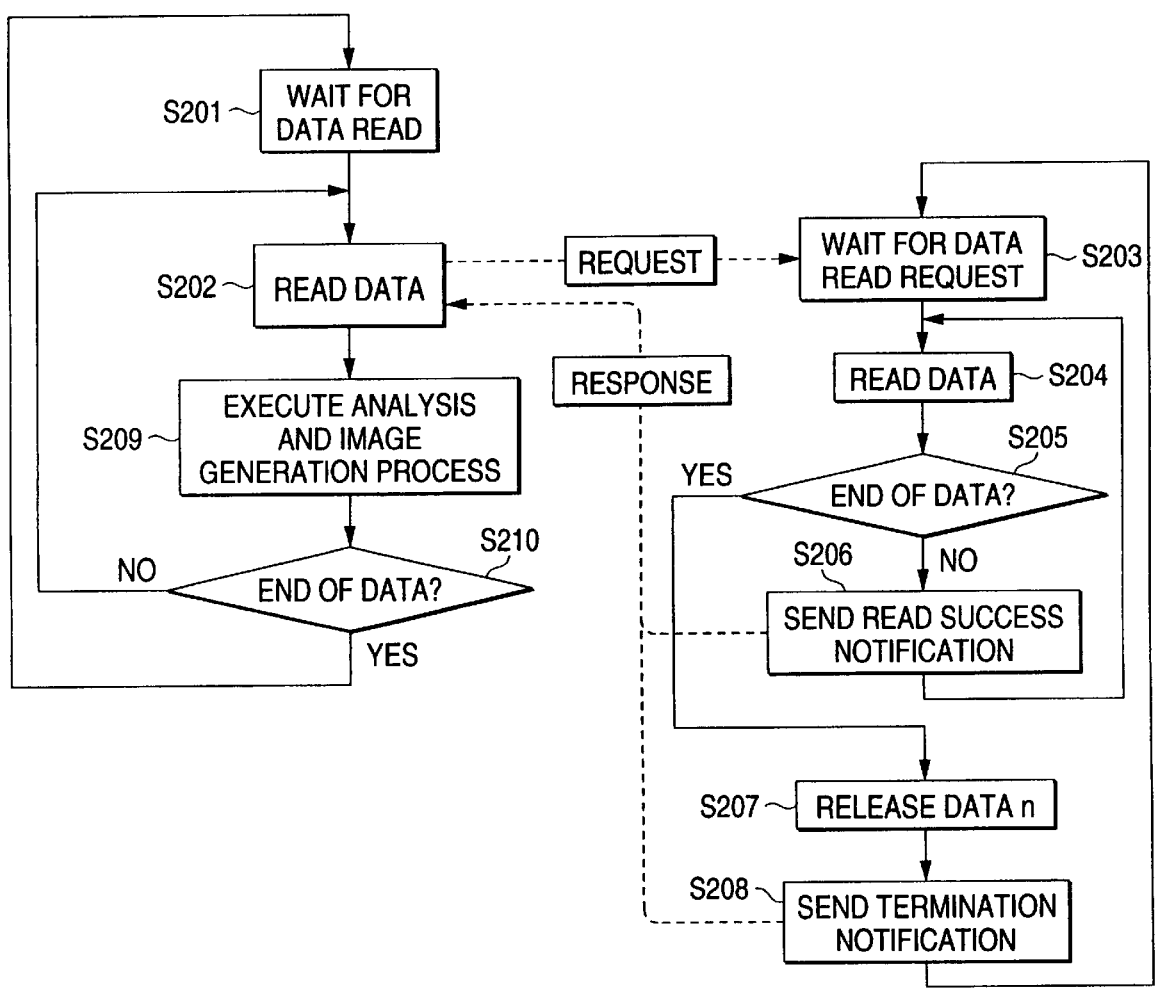
FIG. 8 is a flowchart to explain the operation (No.2)

Next, the operation of the image processing system in first embodiment will be discussed. FIG. 7 is a flowchart to explain the operation of the input section control task and input buffer control task when data is written into the input buffer in the first embodiment. FIG. 8 is a flowchart to explain the operation of the decomposer task.

For reference numerals not shown in FIG. 7 or 8 in the description that follows, see FIGS. 1 and 2. To clarify the description of the operation, assume that a fault such as a delay of data input does not occur.

When the input section control task 21 senses reception of data at steps S101 and S102, it sends an input buffer allocation request to the input buffer control task 26 at step S103. Upon reception of the input buffer allocation request from the input section control task 21, the input buffer control task 26 reserves an unused block shown in FIG. 6. Whether or not each entry is used can be determined by providing flag; in the embodiment, the upper limit value is used as the flag as follows:

Upper limit value=0: Indicates that the entry is used for data N.

Positive integer: Indicates that the entry is used for data N with a limited number of blocks.

Positive infinity: Indicates that the entry is used for data N with an unlimited number of blocks.

The input buffer control task 26 retrieves the entries shown in FIG. 6 and records the maximum number of blocks for each data calculated by an upper limit value calculation section in an unused entry. For example, assuming that the block size is 8 Kbytes and that the maximum number of blocks is 4, the capacity of the input buffer that can be used for the data becomes 32 Kbytes. Based on the capacity, data is input and stored in the input buffer at steps S104 and S105. It is stored until the end of the data is reached at step S106.

Here, reservation of the input buffer and data storage will be discussed. When the input section control task 21 requests the input buffer control task 26 to write the input data into the input buffer, the input buffer control task 26 compares the upper limit value with the number of blocks held in the current list (steps S107–S109).

If the upper limit value is greater than the current value in the comparison, a block with flag=unused is retrieved and if it is found, the block reserved with the flag set to unused is linked. Then, the write data from the input section control task 21 is copied into the reserved block and a response indicating normal storage of the data is returned (steps S110–S113).

On the other hand, if the upper limit value is less than or equal to the current value or all blocks are used (an unused block does not exist), a retry is made until block reservation results in success at steps S111 and S112. When the input section control task 21 senses the end of the data, it notifies the input buffer control task 26 of the termination of the reception.

Next, data read will be discussed. When the data control task 25 receives a data reception start notification from one of the input interfaces, a data read request is sent to the input buffer control task 26 (steps S201 and S202) and the data stored in blocks in accordance with the storage order held as a list structure as shown in FIG. 6 is transmitted to the data control task 25 (steps S203 and S204).

Next, whether or not the end of the data is read is determined at step S205. If the end of the data is read, a read success notification is sent at step S206; otherwise, the reserved area is released at steps S207 and S208.

When all blocks registered in the list are deleted after the data control task 25 receives a reception termination notification from the input section control task 21, it indicates that all data has been read. Then, the entry is released for the next data reception and the decomposer task 22 executes an analysis and image generation process until the end of data is reached at steps S209 and S210.

To set the upper limit value, the user may set the upper limit value of the number of blocks for each interface through the operation panel. In this case, the input buffer control task 26 reserves the buffer, it references the upper limit value for each input interface held by the UI control task 27. That is, the input buffer control task 26 references the priority for each host system (user) set by the user through the operation panel and an upper limit value calculation table for obtaining the upper limit value responsive to the priority, thereby determining the upper limit value.

Alternatively, to set the upper limit value, the data processing capability or throughput for each input interface is calculated and the upper limit value may be determined in response to the data throughput.

Alternatively, to set the upper limit value, the data throughput value for each input interface is calculated from the past use history and the upper limit value may be set based on the calculated value.

For example, the use history may contain an average value found from the total data size and the total number of data pieces received for each interface counted by the input buffer control task 26 or an average value according to the time band that can be calculated by using the timer 3.

For example, to calculate the input buffer capacity based on the average data amount for each interface obtained from the total number of data pieces and the total data amount input in the past, the following calculation expression is used:

Input buffer amount for interface $P = P \cdot \text{foo}(x)$ when basic input buffer amount for interface P=BUFp total number of data pieces for interface A=Np total data amount for interface A=Mp weight calculation function foo (x)

where average data amount per data piece, x,=Mp/Np $\Sigma(\text{BUFp} \cdot \text{foo}(x))$=total input buffer capacity for all P As alternative setting of the upper limit value, the time taken for storing image data per unit amount is stored in the input buffer is recognized for each input interface and the upper limit value can be set based on the recognized time.

For example, if the storage time of the image data per unit amount is long, the upper limit value of the input buffer for the input interface is set large; if the storage time is short, the upper limit value of the input buffer for the input interface is set small, whereby the input buffer can be allocated to the input interfaces effectively.

As alternative setting of the upper limit value, the interrupt time per unit time for which image data input through each input interface is interrupted during execution of one job is recognized and a predetermined upper limit value can also be set for the input interface corresponding to the shortest interrupt time recognized.

The input buffer capacity can also be calculated based on the ratio between the data storage time from the storage start time to the storage end time for each input interface and the buffer full condition duration for each data piece obtained from the data input interrupt time because data is stored in all the available input buffer area, namely, the buffer full condition duration.

An example of the calculation expression used by an allocation amount calculation section is given below:

Input buffer amount for interface $P = P \cdot \text{foo}(x)$ when basic input buffer amount for interface P=BUFp total data input time for interface P=Tp total buffer full condition duration for interface P=Tp weight calculation function foo (x)

where average buffer full condition duration per data piece, x,=Tfull/Tp $\Sigma(P \cdot \text{foo}(x))$=total input buffer capacity for all P If the input interfaces are of the type wherein two-way communication can be executed, the upper limit value can also be determined by referencing a throughput inspection table listing the host system capability determined from information of the CPU type, memory installation amount, operating system type, etc., returned from the host system in response to an inquiry (level a–d from high to low) and the printer capability determined from the CPU and installation memory amount of the printer returned from the system control task 24 in response to an inquiry made by the print section 6 (level A–D from high to low), as shown in FIG. 9A.

If the input interfaces are of the type wherein only one-way communication can be executed, the upper limit value may be determined by referencing a throughput inspection table as shown in FIG. 9B in response to the input interface capability.

If the host system comprises a spooler, the upper limit value may be determined from the data storage speed and the data read speed because a relationship exists between the input buffer amount and the throughput value when data passes through the input buffer. On the other hand, if the host system does not comprise a spooler, no limit is placed on the upper limit value of the input buffer to minimize the client release time.

The upper limit value for each input interface may be set in response to the priority levels added to the host systems, may be set in response to the priority levels previously added to the users of the host systems, or may be set based on the priority levels added to the image data to be transferred.

The upper limit value may be set in response to the priority level set for each input interface, in which case a predetermined upper limit value is set for the input interface of low priority and an upper limit value higher than that set for the input interface of low priority is set for the input interface of high priority or the input buffer is allocated unlimitedly to the input interface of high priority without setting the upper limit value, whereby the image data input through the input interface of high priority can be stored preferentially.

As alternative setting of the upper limit value, the number of unused blocks is compared with the remaining data amount and if the amount of data that can be stored in the unused blocks is greater than the remaining data amount, the input buffer control task can also temporarily set the upper limit value to an unlimited value. In the embodiment, the application condition of no limit is effective only for the data. At this time, the input buffer control task 26 needs to be notified of the total amount of the data when an input buffer allocation request is made, etc.

As alternative setting of the upper limit value, the data amount of image data input through each input interface in job units is measured and the upper limit value may be set for the input interface with a large data amount measured.

As alternative setting of the upper limit value, the capacity of blocks in which no image data is stored is recognized and if the recognized capacity is greater than a predetermined amount, the upper limit value may be set high.

A weighted value may be adopted for the number of unused blocks. For example, assuming that a weight coefficient=50% (constant), if the number of unused blocks is 4, the maximum number of blocks=2 is adopted as the upper limit value.

As alternative setting of the upper limit value, the input buffer control task 26 can also dynamically change the upper limit value by referencing an upper limit value setting table responsive to the number of data pieces being input as shown in FIG. 10. For example, the upper limit value of data n with the number of data input pieces=3 and the data order=2 is 2 and if processing of the data with the data order 1 is complete in this state, the data order of the data n becomes 1 and the number of input data pieces becomes 2, thus the upper limit value is changed to 4.

If an amount of image data less than the upper limit value set so as to prevent specific image data from monopolizing the input buffer is input through a specific input interface, the upper limit value for the specific input interface may be again set.

As alternative setting of the upper limit value, the number of data pieces of image data stored in the input buffer in job units is recognized and the fewer the number of data pieces, the higher the setup upper limit value.

In the first embodiment, the upper limit value of the input buffer for each input interface is determined in various manners, whereby the input buffer can be shared among the input interfaces without being allocated only to one input interface.

Figure 11:
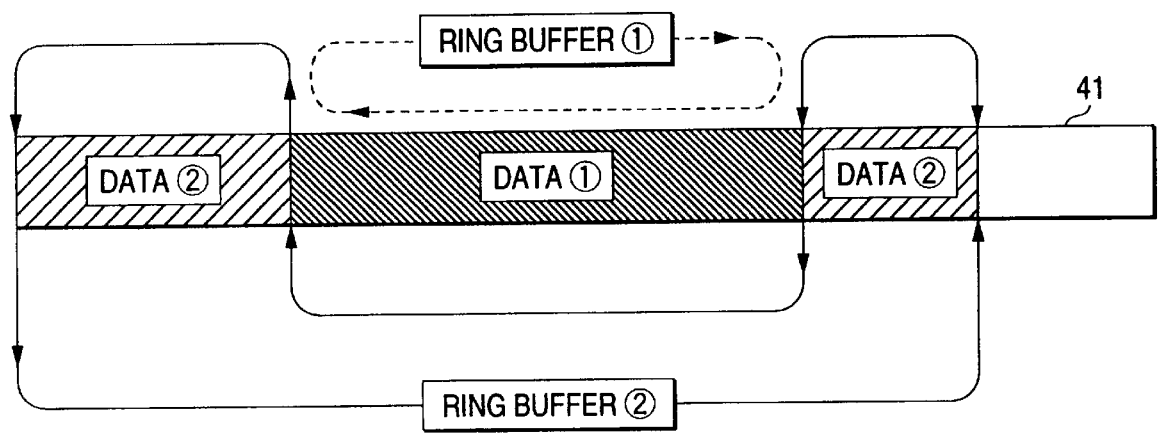
FIG. 11 is a schematic diagram to explain ring buffers.
Figure 12A:
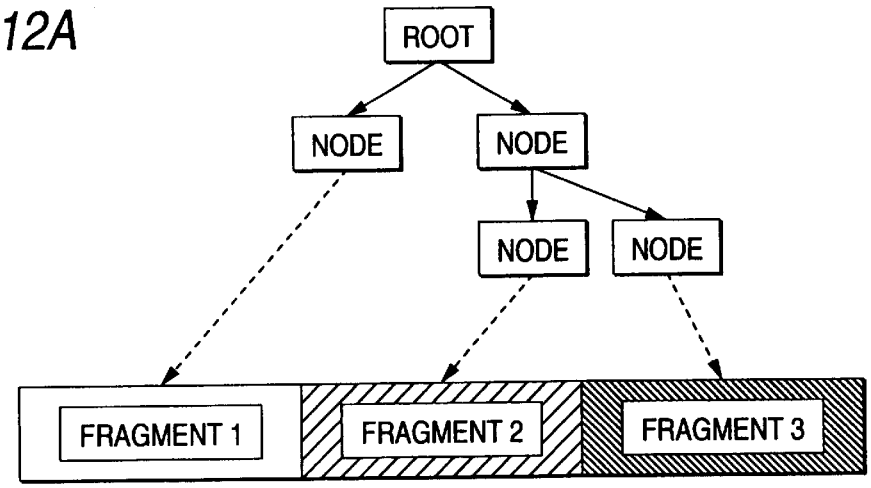
FIGS. 12A and 12B are schematic diagrams to explain an organization example of a binary tree, respectively.
Figure 12B:
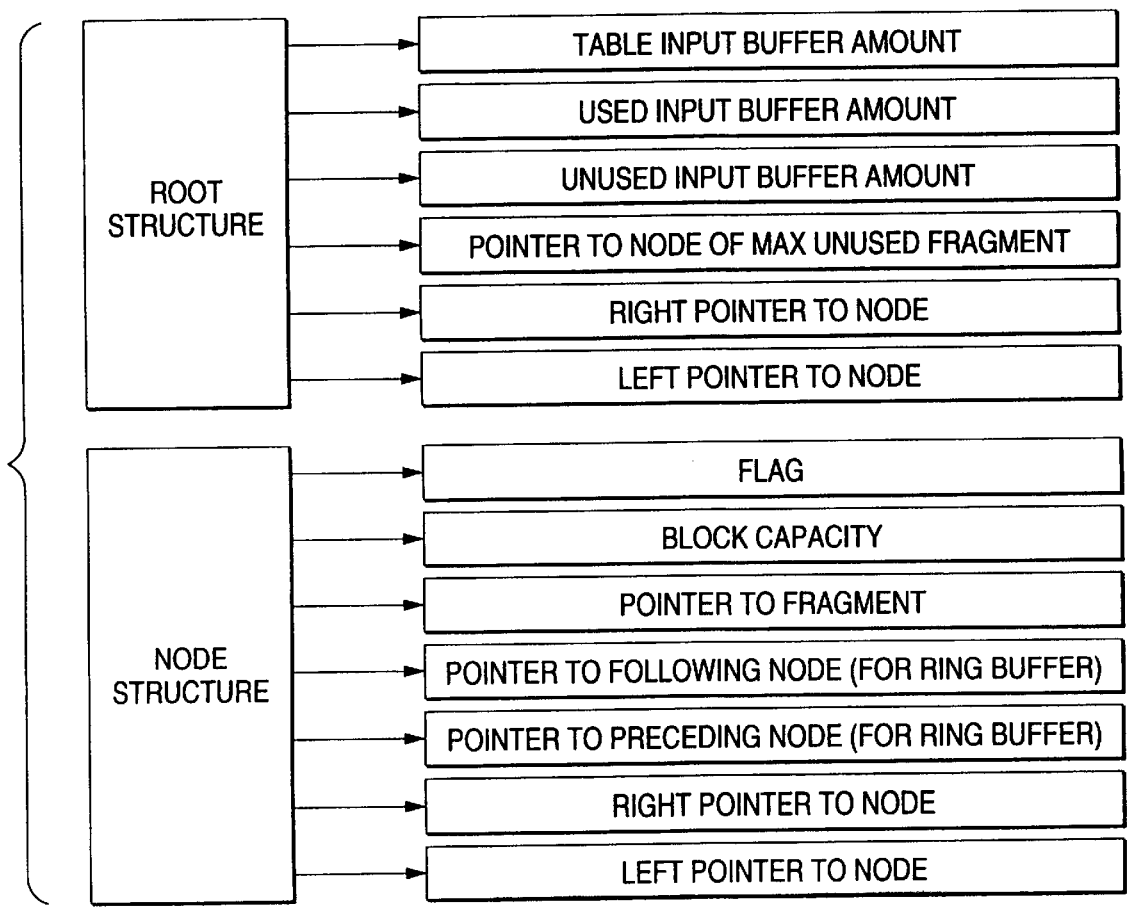

Next, a second embodiment of the invention will be discussed. FIG. 11 is a schematic diagram to explain ring buffers applied in the second embodiment. FIGS. 12A and 12B are schematic diagrams to explain an organization example of a binary tree. FIGS. 13A to 13G are schematic diagrams to explain input buffer management in the second embodiment. FIGS. 14A to 14D are schematic diagrams to explain binary tree reduction rules applied in the second embodiment.

In the second embodiment, an input buffer allocated to each input interface by an input buffer control task 26 is installed as ring buffers as shown in FIG. 11. The ring buffers are provided to manage data stored in an input buffer 41 like a ring. If a contiguous area of the input buffer 41 is used for data (1) as shown in FIG. 11, ring buffer (1) is formed according to the top and end addresses of the contiguous area; if split areas in the input buffer 41 are used for data (2) as shown in the figure, ring buffer (2) is formed according to the top and end addresses of the split areas as if a contiguous area were used.

For example, an area of the input buffer can be reserved from all the remaining capacity, the maximum unused contiguous fragment capacity, etc.

Here, a procedure of recognizing the maximum unused contiguous fragment capacity will be discussed. A binary tree of an organization as shown in FIG. 12A is used as an input buffer management method. To insert or delete a node, the used or unused input buffer amount is calculated from the fragment capacity and is stored in a determined region of the root, whereby it is made possible to recognize the total empty area capacity of the input buffer.

A pointer to the node of the maximum unused fragment is set from the reserved fragment capacity at the same time. Thus, the maximum unused fragment capacity can be obtained.

Figure 13A:
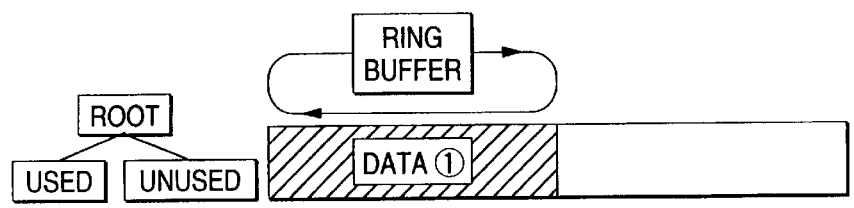
FIGS. 13A to 13G are schematic diagrams to explain input buffer management, respectively.
Figure 13B:
Figure 13C:
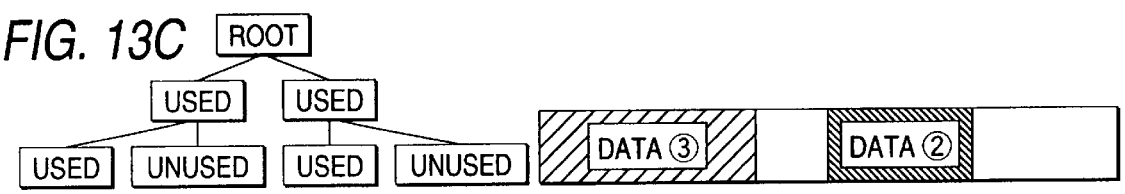
Figure 13D:
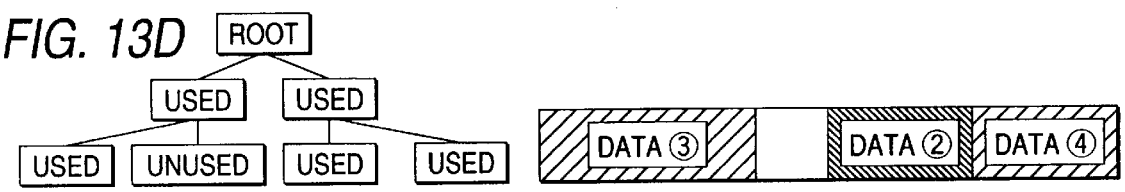

By the way, empty areas need to be merged depending on the release order of used input buffer areas as seen in FIGS. 13C to 13D. In such a case, a binary tree reduction process is executed according to the merge rules as shown in FIGS. 14A to 14D.

Figure 13E:
Figure 13F:
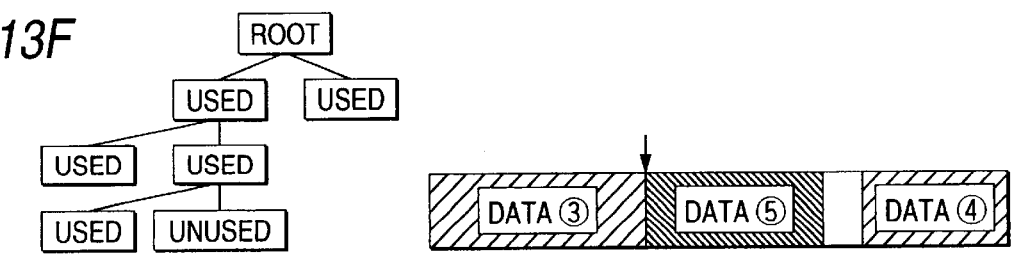
Figure 13G:
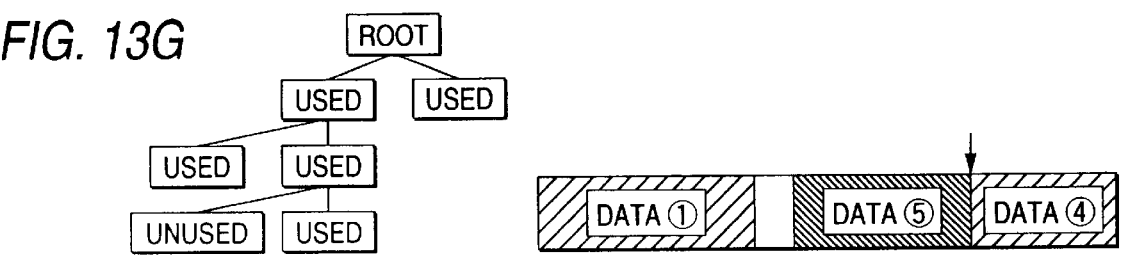
Figure 14A:
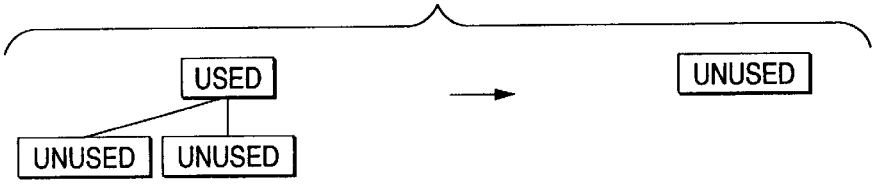
FIGS. 14A to 14D are schematic diagrams to explain binary tree reduction rules.
Figure 14B:
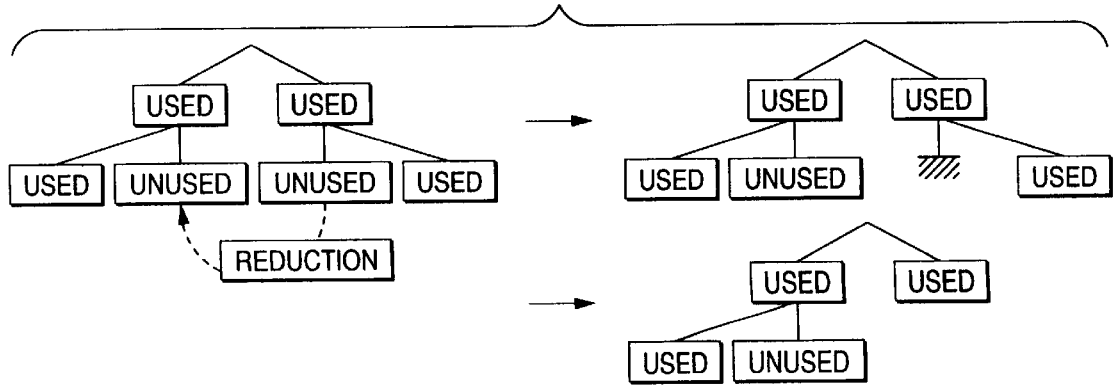
Figure 14C:
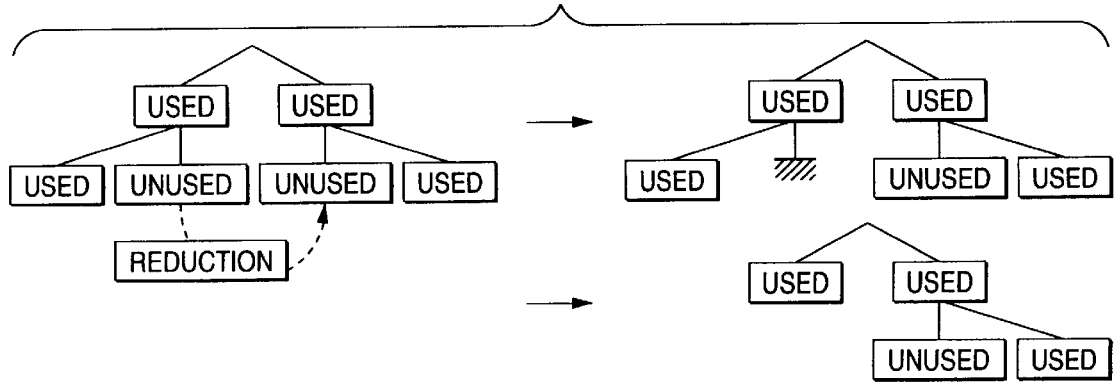
Figure 14D:
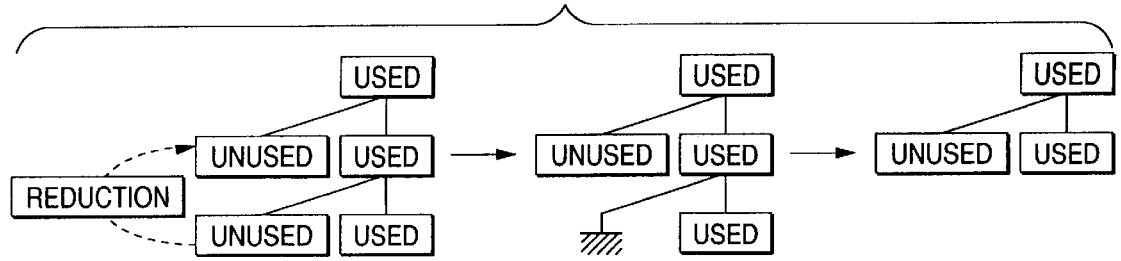

The area for data (5) may be reserved as FIG. 13F wherein it is reserved from the side of data (3) or FIG. 13G wherein it is reserved from the side of data (4) as seen in FIGS. 13E to 13G. Which of FIGS. 13F and 13G is to be adopted depends on the time until the storage area of data (3) is released and the time until the storage area of data (4) is released.

That is, if the time until the storage area of data (3) is released is shorter than the time until the storage area of data (4) is released, FIG. 13F is adopted; otherwise, FIG. 13G is adopted. This algorithm enables suppression of fragmentation occurrence in the input buffer. The selection criterion is not limited to it.

Next, a procedure of reserving an area of the input buffer from all the remaining capacity will be discussed. To insert or delete a node, the comparison result between the input buffer capacity to be reserved and the maximum unused fragment capacity is stored in a determined region of the root and is updated, whereby a pointer to the node of the maximum unused fragment can be obtained.

Unlike formation of a ring buffer only within each fragment as described above, an amount of the input buffer calculated from the remaining capacity recognized must be reserved. Thus, a list connecting the fragments as shown in FIG. 12B is used. To hold the list structure, regions for storing pointers to the preceding and following nodes are provided in the structure of each node.

Figure 15:
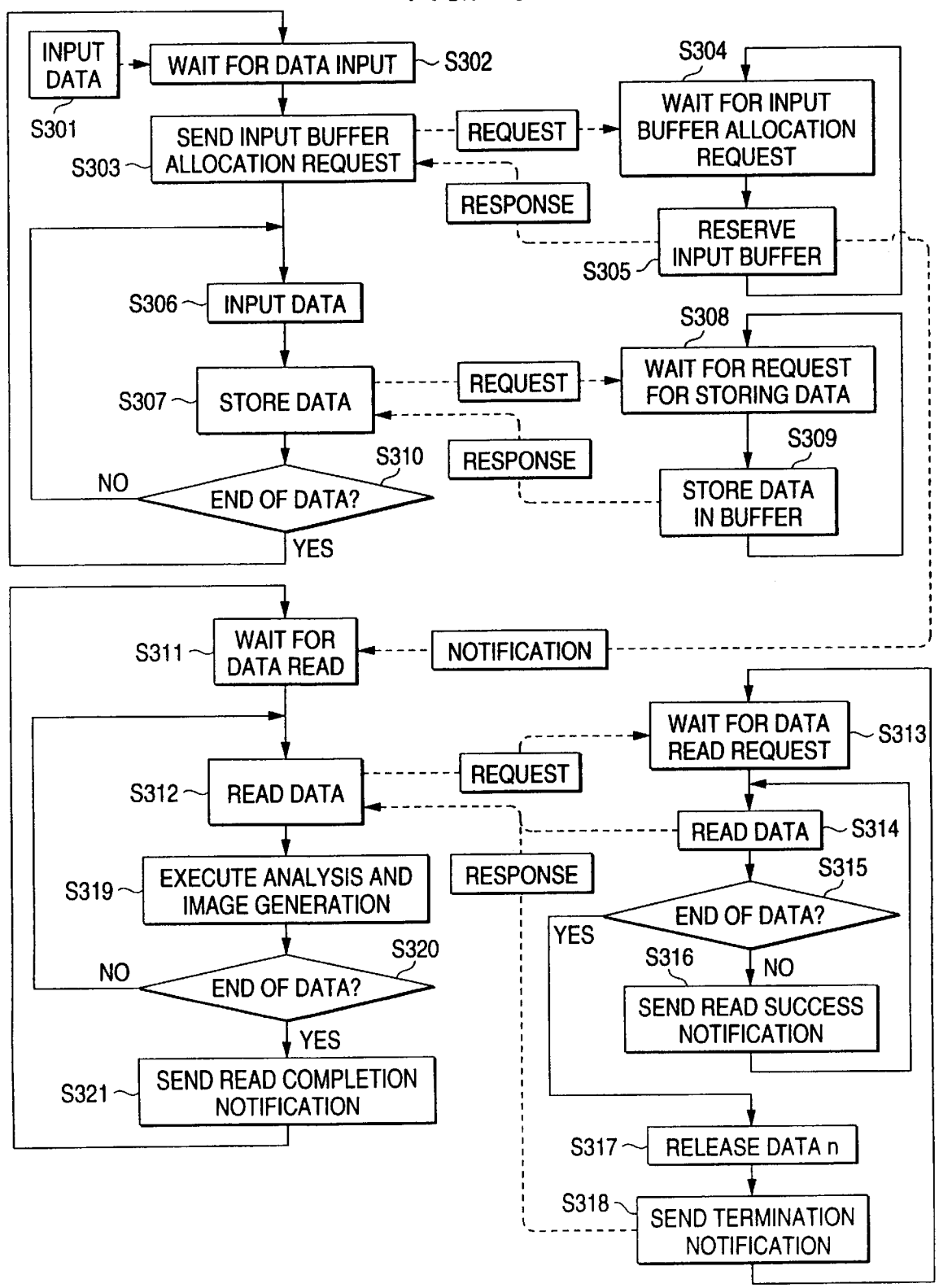
FIG. 15 is a flowchart to explain the operation (No.3)

Then, the operation will be discussed along a flowchart shown in FIG. 15. In the embodiment, 50% of the remaining amount is always allocated, but the calculation method is not limited to it. For reference numerals not shown in FIG. 15, see FIGS. 1 and 2.

First, when the input buffer control task 26 makes an allocation request of the input buffer 41 from an input interface (steps S301–S303), an input buffer area is reserved in the amount of 50% of the remaining memory capacity recognized according to the above-described procedure (steps S304–S305) and a notification is sent to the input interface. As in the first embodiment, an input section control task 21 detects the end of data and notifies the input buffer control task 26 of the storage completion (steps S306–S310). At the completion of read of a decomposer task 22 (steps S311–S318), the input buffer control task 26 releases the reserved area.

According to the second embodiment, the capacity of the input buffer to be reserved can be determined based on the remaining capacity of the input buffer and the input buffer having a small memory amount can be allocated to a number of input interfaces effectively.

Figure 16:
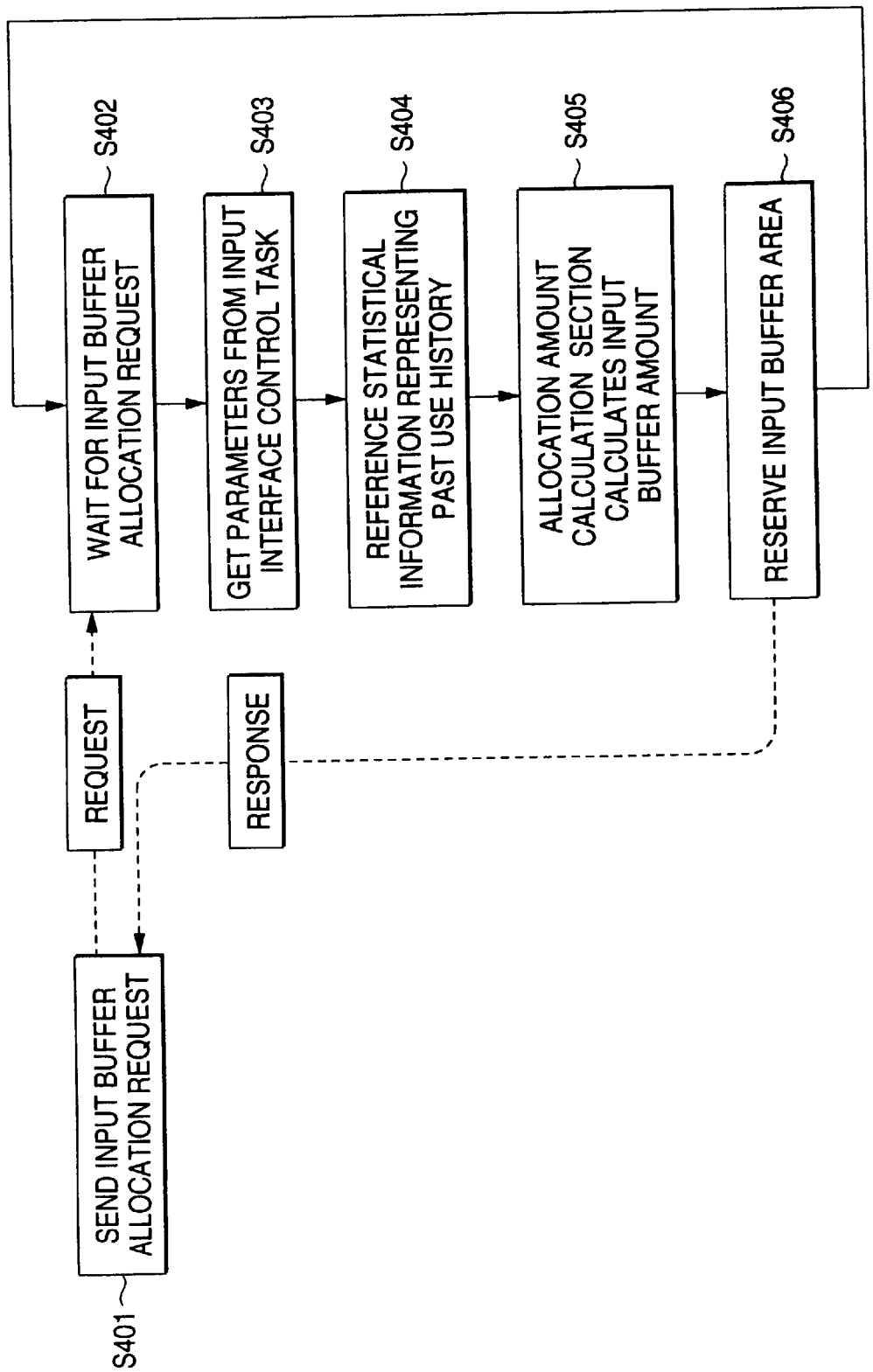
FIG. 16 is a flowchart to explain the operation (No.4).

Next, a third embodiment of the invention will be discussed. FIG. 16 is a flowchart to show the operation of referencing a use history and calculating the input buffer capacity in the third embodiment.

First, when an input buffer control task 26 makes an input buffer allocation request from an input interface at step S401, an input buffer area as large as the calculated capacity is reserved (steps S402–S406). In the calculation method shown in FIG. 16, statistical information representing the past use history is referenced and the input buffer amount allocated to each input interface is calculated.

After this, an input interface control task is notified that the input buffer area has been reserved. As in the first and second embodiments, when an input section control task 21 notifies the input buffer control task 26 of the reception termination, the input buffer control task 26 releases the reserved area.

In addition to the input buffer reservation method using a use history, an input buffer capacity may be calculated based on the average throughput value for each interface calculated from the reception time and expansion timer per unit data amount measured with a timer 3 by the input buffer control task 26 for reserving an input buffer area based on the calculated input buffer capacity.

An example of the calculation expression used by an allocation amount calculation section is given below:

Storage speed of input interface control task THin=data amount/(storage end tim−storage start time) [bytes/second]

Processing speed of decomposer task THdcmp=data amount/(read end time−read start time) [bytes/second]

Throughput value=THin/THdcmp

Assuming that new average throughput value is THn, that current throughput value is THc, and that throughput value of present data is THd, THn=(THc+THd)/2 [no units]

$BUF_p$·foo (THn)=total capacity

It is possible that the smaller the throughput value calculated according to the expression, the shorter the connection duration to the host system. Thus, the input buffer capacity may be calculated simply based on the connection time to the host system.

The input buffer capacity can also be calculated based on the average data amount for each interface obtained from the total number of data pieces and the total data amount input in the past.

An example of the calculation expression used by the allocation amount calculation section is given below:

Input buffer amount for interface P=P·foo (x)
when
   basic input buffer amount for interface P=BUFp
   total number of data pieces for interface A=Np
   total data amount for interface A=Mp
   weight calculation function foo (x)
   where average data amount per data piece, $x,=Mp/Np$
   $-(BUF_p\cdot foo (x))$=total input buffer capacity for all P Further, the input buffer capacity can also be calculated based on the ratio between the data storage time from the storage start time to the storage end time for each input interface and the buffer full condition duration for each data piece obtained from the buffer full condition duration.

An example of the calculation expression used by the allocation amount calculation section is given below:

Input buffer amount for interface P=P·foo (x)
when
   basic input buffer amount for interface P=BUFp
   total data input time for interface P=Tp
   total buffer full condition duration for interface P=Tp
   weight calculation function foo (x)
   where average buffer full condition duration per data piece, $x,=Tfull/Tp$
   $\Sigma(P\cdot foo (x))$=total input buffer capacity for all P In the third embodiment, the capacity of the input buffer to be reserved can be determined in response to the input interface use condition, so that the input buffer having a small memory amount can be allocated to a number of input interfaces effectively.

In the embodiments we have discussed, the image processing systems are mainly taken as an example. However, the invention can also be applied to information processing systems for processing text data, etc., other than image data.

As we have discussed, according to the image processing system and information processing system of the invention, if data is input through a number of input interfaces, the input buffer can be shared efficiently among the input interfaces for reducing the loads of the host systems.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention.

The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing system comprising:

a plurality of input interfaces for inputting image data output from a plurality of host systems;

an input buffer being divided into a plurality of blocks for storing the image data input through said plurality of input interfaces;

means for determining an upper limit value of a storage amount of the image data stored in said input buffer for at least one of said plurality of input interfaces;

means for storing image data of one job in blocks of said input buffer in a scattering manner so as not to exceed the upper limit value determined by said determination means;

means for recognizing a data processing capability of said image processing system for each input interface, wherein said determination means determines the upper limit value in response to the data processing capability recognized by said image processing system capability recognition means; and means for recognizing a data processing capability of each of said host systems for each of said input interfaces, wherein said determination means determines the upper limit value in response to the data processing capability recognized by said host system capability recognition means.

2. The image processing system as claimed in claim 1, further comprising means for setting a priority for each of said input interfaces;

wherein said determination means determines the upper limit value in response to the priority set through said setting means.

3. The image processing system as claimed in claim 2, further comprising means for inputting priority values added to said host systems, said setting means for setting the priority values set through said priority value input means.

4. The image processing system as claimed in claim 2, further comprising means for inputting priority values added to users of said host systems, said setting means for setting the priority values set through said priority value input means.

5. The image processing system as claimed in claim 2, further comprising means for inputting priority values added to the image data, said setting means for setting the priority values set through said priority value input means.

6. The image processing system as claimed in claim 2, wherein said determination means determines the upper limit value for the input interface assigned a low priority set through said setting means.

7. The image processing system as claimed in claim 2, wherein said determination means determines the upper limit value for the input interface assigned a high priority set through said setting means.

8. The image processing system as claimed in claim 1, further comprising means for recognizing total data amount of image data of one job input through the input interface;

wherein said determination means determines the upper limit value so that the image data whose data amount is recognized by said data amount recognition means is all stored.

9. The image processing system as claimed in claim 1, further comprising means for measuring a data amount of image data input through said input interface in job units for each of said input interfaces;

wherein said determination means determines the upper limit value for the input interface assigned a large data amount measured by said data amount measurement means.

10. The image processing system as claimed in claim 1, further comprising means for recognizing a capacity of blocks of said storage means in which no image data is stored;

wherein said determination means determines the upper limit value when the capacity recognized by said capacity recognition means is large.

11. The image processing system as claimed in claim 1, further comprising means for inputting the upper limit value;

wherein said determination means determines the upper limit value input through said input means.

12. An image processing system comprising:

a plurality of input interfaces for inputting image data output from a plurality of host systems;

an input buffer being divided into a plurality of blocks for storing the image data input through said plurality of input interfaces;

means for determining an upper limit value of a storage amount of the image data stored in said input buffer for at least one of said plurality of input interfaces;

means for storing image data of one job in blocks of said input buffer in a scattering manner so as not to exceed the upper limit value determined by said determination means; and means for recognizing a data processing capability of said image processing system for each input interface;

wherein said determination means determines the upper limit value in response to the data processing capability recognized by said image processing system capability recognition means.

13. The image processing system as claimed in claim 12, further comprising means for inputting a value responsive to the data processing capability;

wherein said image processing system capability recognition means recognizes the data processing capability from the value input through said processing capability value input means.

14. The image processing system as claimed in claim 12, further comprising means for measuring a value responsive to the data processing capability;

wherein said image processing system capability recognition means recognizes the data processing capability from the value measured by said processing capability value measurement means.

15. The image processing system as claimed in claim 12, wherein said image processing system capability recognition means recognizes a data amount of image data input per unit time through each of said input interfaces; and wherein said determination means determines the upper limit value for the input interface assigned a large data amount recognized by said recognition means.

16. The image processing system as claimed in claim 12, wherein said image processing system capability recognition means recognizes time for which image data per unit amount is stored in said input buffer; and wherein said determination means determines the upper limit value for the input interface through which image data stored long for the time recognized by said recognition means is input.

17. The image processing system as claimed in claim 12, wherein said image processing system capability recognition means recognizes interrupt time per unit time for which image data input through each of said input interfaces is interrupted during one job; and wherein said determination means determines the upper limit value for the input interface assigned the short interrupt time recognized by said recognition means.

18. An image processing system comprising:

a plurality of input interfaces for inputting image data output from a plurality of host systems;

an input buffer being divided into a plurality of blocks for storing the image data input through said plurality of input interfaces;

means for determining an upper limit value of a storage amount of the image data stored in said input buffer for at least one of said plurality of input interfaces;

means for storing image data of one job in blocks of said input buffer in a scattering manner so as not to exceed the upper limit value determined by said determination means; and means for recognizing a data processing capability of each of said host systems for each of said input interfaces;

wherein said determination means determines the upper limit value in response to the data processing capability recognized by said host system capability recognition means.

19. The image processing system as claimed in claim 18, wherein said host system capability recognition means senses whether or not each of said host systems comprises a spooler used to output image data; and wherein said determination means determines the upper limit value for the input interface to which image data is input from the host system recognized to have a spooler.

* * * * *